United States Patent Office 3,248,170
Patented Apr. 26, 1966

3,248,170
CRYSTALLINE ZEOLITE U
Bruno Kvetinskas, Arlington Heights, Ill., assignor to Universal Oil Products Company, Des Plaines, Ill., a corporation of Illinois
No Drawing. Continuation of application Ser. No. 182,509, Mar. 26, 1962. This application Apr. 8, 1965, Ser. No. 449,365
5 Claims. (Cl. 23—111)

The application is a continuation of my co-pending application Serial No. 182,509 filed March 26, 1962, now abandoned, which was a continuation-in-part of application Serial No. 13,456 filed March 8, 1960, now abandoned.

This invention relates ot new compositions of matter comprising zeolites having sorbent properties capable of separating mixtures of compounds on the basis of their molecular sizes. More specifically, this invention relates to zeolitic, crystalline metal aluminosilicates of the molecular sieve type characterized and defined by their X-ray diffraction pattern, composition, and physical and chemical properties.

The number of known metal aluminosilicates each having distinct compositions and characteristic properties is large. Many of these occur in hydrated form and contain ions which are replaceable by ion-exchange methods; these silicates are known as zeolites and occur widely distributed in natural forms; many of the natural zeolites may be duplicated synthetically and other forms having no naturally-occurring counterpart may also be synthesized. Each crystalline modification has its own characteristic crystal lattice structure which provides a characteristic X-ray diffraction pattern, unlike, exactly, the X-ray diffraction pattern of any other distinct zeolite. Although the chemical analyses of the zeolites are substantially similar in that they all contain a metal cation, usually sodium or calcium, in addition to aluminum, silicon and oxygen, as well as definite amounts of water of crystallization, one type of zeolite can be differentiated from another type having essentially the same chemical compositon by the arrangement of the $SiO_4$ and $AlO_4$ tetrahedra, the latter structural variations resulting in differences in the interplanar distances within the crystal lattice structure. The present invention concerns a new type of zeolite metal aluminosilicate having its own characteristic crytsalline interplanar distances and crystal structure. For the sake of convenience in distinguishing the present zeolitic sorbent from zeolites heretofore known and prepared, the zeolitic composition of the present invention will be referred to herein by a coined designation of its type as "Zeolite, type U".

Certain members of the zeolitic metal aluminosilicate family, including the present "Zeolite, type U," when dehydrated and activated, as hereinafter described, selectively accept into their resulting porous structure molecules having cross-sectional diameters within a definite range of values and selectively reject molecules having cross-sectional diameters greater than the diameter of the pore openings. The separation process based upon the selective acceptance of certain types of compounds by these dehydrated zeolites is called "sorption," as distinguished from adsorption and absorption which involve other physical phenomena. As used herein, "sorption" has also been variously referred to as "occlusion," "entrapment," etc. However the process utilizing the present sorbent is designated these zeolites exhibit molecular sieve properties which involve the separation of mixtures of compounds on the basis of their molecular sizes, which in turn, involves the molecular structure of the compounds in the mixture.

The characteristics of certain zeolites which account for their molecular sieve activity are their chemical composition, the arrangement of the $SiO_4$ and $AlO_4$ tetrahedra, and the positon and species of the cations present in the crystal structure of these silicates. The alternating $AlO_4$ and $SiO_4$ tetrahedra in the lattices of the crystal structure gives rise to a single unsatisfied electronegative valence band for each aluminum atom in the structure which is neutralized by a cation, such as an equivalent of an alkali metal, alkaline earth metal or other cation. Although the cation initially present in the crystal structure may be of one species only, such as sodium, a portion or all of the cations initially present in the zeolite may be replaced by ion-exchange, for example, in accordance with procedures hereinafter described.

In addition to the $SiO_4$ and $AlO_4$ tetrahedra and the metal cation which comprises the silicate crystal of the present Zeolite U, freshly prepared zeolite also contains water of hydration which occupies intercrystalline spaces. When the water of hydration is removed during the activation stage of the present method of preparation, a network of intercrystalline channels remain, having openings of from about 3 to about 5 Angstrom units in diameter, depending upon the particular cation occupying the crystal structure. When the cation is $H^+$, $Ca^{++}$ or $Mg^{++}$, for example, the channel openings in the zeolite structure are approximately 5 Angstroms; sodium Zeolite U contains channels having openings of about 4 Angstroms in cross-sectional diameter, etc. The resulting channels which interlace the crystal provide numerous pockets into which molecules whose mean cross-sectional diameters are less than the pore openings will fit. Thus, for example, normal hydrocarbons in the organic series will generally enter the channels of Zeolite U in which the openings are about 5 Angstroms in cross-sectional diameter, although branched chain and cyclic organic compounds will not enter because the molecular diameters of the latter classes of compounds, being larger than the average size of the pore openings, prevent their entry into the pores. On the other hand, even normal compounds will not enter Zeolite U in which the channel openings are about 4 Angstroms in cross-sectional diameter. The unique sorptive properties of these zeolites may be exploited in separating, for example, normal compounds from a mixture containing the same and their branched chain isomers, to remove moisture from gases and liquids, as well as in a large number of other separation problems. One of the most useful applications of these properties of Zeolite U to separate mixtures of compounds is the removal of normal hydrocarbons from petroleum fractions boiling in the gasoline or jet fuel boiling range, thereby increasing the octane number of the non-sorbed components (raffinate fraction) of, say, a gasoline boiling range cut so treated, and also providing a means for separating the normal components of gas oil and fuel oil fractions which are espectially desirable fuels for jet engines, having low luminosity and little or no tendency to smoke upon ignition.

The product of this invention, herein referred to as "Zeolite U" is formed by a combination of process steps involving first the crystallization of an alkali metal aluminosilicate, preferably the sodium derivative, from an aqueous solution or suspension of the reactants. The sodium or other alkali metal form of the Zeolite U is generally prepared initially to form one embodiment of the compositions comprising this invention, since it can be prepared inexpensively from commonly available, water-soluble or water-dispersible reactants. The sodium salt is readily converted to other alkali metal derivatives or to the alkaline earth metal or other cationic derivatives by ion-exchange procedures, hereinafter more fully described. The reaction involved in the formation of the sodium or other alkali metal form of Zeolite U is basically the interaction of water-soluble or water-dispersible compounds incipiently capable of yielding the gel oxides of the elements which make up the composition of the zeolite, that is, the oxides and/or hydroxides of the alkali metal such as sodium, silicon, and aluminum in the presence of water. Suitable reagents for the preparation of the alkali metal derivative, comprising one of the embodiments of this invention, is silicic acid (silica sol) in which the alkali metal is present in not more than a maximum ionic proportion, herein set forth as a maximum in the $M_2O/SiO_2$ ratio and generally in an amount not substantially in excess of one molar equivalent of alkali metal per molar proportion of aluminum in the reaction mixture. The alkali metal, such as sodium may be added in a form combined with hydroxyl as NaOH, with silicate as "water glass," or in any other basic form. Potassium silicate may be utilized as the source of the alkali metal in a reaction mixture in which the potassium Zeolite U is formed. A low alkali metal ion content of the initial, gel-forming reaction mixture is a process variable which is responsible for the formation of the present Zeolite type U product, rather than any other zeolite. The substantially alkali metal-free, colloidal, silicic acid sols, therefore, constitute an especially desirable source of the silica in the zeolite-forming reaction mixture, the product obtained therefrom is consistently essentially pure Zeolite U, to which this invention is specifically directed. The dialkyl silicates which yield silicic acid via hydrolysis of the silicate ester, and preferably, the aqueous dispersions of silicic acid itself in the form of water-dispersed, substantially alkali metal-free silica sols formed by removal of the alkali metal ion from the aqueous dispersions of the alkali metal silicates (for example, by ion exchange procedures) are especially suitable primary sources of the silica reactant in the present process. The latter source of silica sol is especially preferred herein because the exceptionally low alkali metal ion content of these dispersions reduces the alkali metal oxide to silica ratio in the initial gel-forming mixture which is believed to be essential to the production of high yields of Zeolite U.

The aluminum oxide component of the present Zeolite U is conveniently provided in the form of an aqueous solution of alkali metal aluminate, in which the alkali metal is lithium, sodium, or potassium, although other water-soluble aluminum salts and aluminum derivatives may also be provided, including, for example, aluminum acetate, aluminum chloride, aluminum oxychloride, an alumina gel dispersion in water, etc. The latter alumina gel dispersions are prepared by mixing aqueous solutions of an aluminum salt, such as aluminum chloride, with a base, such as sodium hydroxide or ammonium hydroxide at carefully controlled mixing conditions. One of the preferred sources of alumina gel for use herein, especially preferred because of the absence of contamination by other metal ions, is the gel formed by reaction of aluminum metal with water, which reaction may be catalyzed by mercury or a mercuric salt dissolved in the water. The resultant gel is a suspension of highly dispersed, finely divided aluminum oxide particles which produces an especially uniform Zeolite U product in high yield. In the production of the alkali metal derivative of Zeolite U wherein an ion-free sol is utilized as the source of the silica and/or alumina, the alkali metal ion content of the reaction mixture may be below the stoichiometric level required to form the alkali metal zeolite. In the latter event, a water-soluble alkali metal base, such as an alkali metal hydroxide, carbonate or bicarbonate may be, and is desirably, added to the initial reaction mixture in order to provide the required alkali metal ion content to form the zeolite. The $M_2O/Al_2O_3$ (where M is an alkali metal) molar ratio in the reaction mixture is preferably maintained at not appreciably in excess of 1/1 to produce the present Zeolite U product. Thus, if required, an alkali metal hydroxide, such as potassium hydroxide, may be added to an aqueous mixture of silica and alumina sols to form the desired product, such as potassium Zeolite U.

In the process of reacting the various water-soluble or water-dispersible reactants involved in the preparation of the alkali metal form of Zeolite U, the ratios of the various oxides present in the reaction mixture are important variables in obtaining a composition corresponding to the desired alkali metal Zeolite U. Reactant proportions which provide the following ratios of the respective oxides, particularly the preferred ratios within the following molar proportions will yield Zeolite U at the reaction conditions specified herein:

| | |
|---|---|
| $M_2O/SiO_2$ | 0.15–0.6, preferably 0.2–0.4. |
| $SiO_2/Al_2O_3$ | 2.0–10.0, preferably 3.0–6.0. |
| $H_2O/M_2O$ | 30–200, preferably 40–100. |

The use of reactant molar ratios outside of the above ranges results in the production of crystalline metal aluminosilicates in which the proportion of Zeolite type U decreases as the reactant proportions departs from the indicated ratios. The ratio of alkali metal oxide to silica in the reaction mixture is the most difficult reaction variable to maintain in the starting mixture, since most readily available forms of silica are generally bound to alkali metals in the form of compounds which provide molar ratios of $M_2O/SiO_2$ greater than the reactant molar ratios specified above and yet the formation of the desired Zeolite U is most sensitive to this variable. In the process of this invention the silica component of the reaction mixture is supplied as a silica sol having an especially low content of alkali metal, such as water glass from which the sodium ions have been predominantly removed by ion exchange techniques. The reactants, in proportions suitable to provide the above-indicated molar ratios of the oxides, are mixed in the form of their aqueous solutions or dispersions and heated at temperatures of from about 25° to about 150° C., and more preferably, at temperatures of from about 50° to 125° C., for a sufficient period of time to complete the deposition of the desired alkali metal aluminosilicate, which crystallizes from the aqueous phase as minute crystals of the hydrated Zeolite type U product. The temperature at which the crystallization is effected controls the time required for complete crystallization, being generally inversely proportional to the temperature. At 100° C., a suitable temperature readily maintained by a boiling water bath, the time required for substantially complete crystallization of the sodium form of Zeolite U is generally not less than about 3 hours and the time may be extended to well over 100 hours, if desired. The crystals, once formed, are stable and may be retained in the aqueous mother liquor for long periods of time without change in structure or yield of crystals. The product, recovered for example, by filtration to remove mother liquor and after washing with deionized water is an alkali metal aluminosilicate which may be activated for its function as a molecular sieve sorbent by heating at a temperature sufficient to remove the water of hydration or water of crystallization, usually at temperatures of from about 150° to about 600° C. and more preferably at from about 300° to about 375° C. The removal of the water of hydration is also facilitated by maintaining the hydrated zeolite at a subatmospheric pressure as the heating proceeds, the last stages of heating preferably being effected at pressures as low as 0.001 mm. Hg in order to effect maximum activation. The resulting, activated alkali metal form of the Zeolite U product is a molecular sieve containing pore openings of about 4 Angstrom units in cross-sectional diameter when the alkali metal present in the composition of Zeolite U is sodium. In its thus activated form it avidly sorbs normally gaseous hydrocarbons containing 3 or less carbon atoms, and to a somewhat lesser extent normal hydrocarbons containing 4 or more carbon atoms, water vapor, and other polar substances, such as carbon dioxide, sulfur dioxide, and hydrogen sulfide from non-sorbed or less readily sorbed gases, such as nitrogen, hydrogen, etc., or from non-sorbed liquids, such as liquefied cyclic and branched chain hydrocarbons.

The sodium form of Zeolite U prior to dehydration or activation, prepared as indicated by the procedure, has a composition corresponding to the following general formula, representative of all forms of zeolites, including the present Zeolite type U:

$$M_{2/n}O:Al_2O_3:XSiO_2YH_2O$$

where M is a metal having a valence of $n$, X is a value which varies, depending upon the particular zeolite considered, but for the present Zeolite U, a value in the range of from 4.3 to about 5.55 generally holds true. The value of Y also varies, depending upon the particular zeolite and the particular metal M involved in the zeolite. In the case of Zeolite U, Y has a value of from 5 to about 8. For the sodium form of Zeolite U in its fully hydrated form, M in the above empirical formula is sodium, $n$ is 1, X has a value of about 5 and Y has a value of about 7.

In addition to the sodium form of Zeolite U the present invention is also directed to other forms of the zeolite in which the sodium cation of the crystal is replaced at least in part by other cations of not only the alkali metal and alkaline earth metals, but also of other mono-valent and divalent metals and non-metals. The method of effecting such replacement involves ion-exchange of the sodium or other initial alkali metal ion in the crystal lattice structure of the initial product with a replacement ion, for example, by surrounding the crystals of hydrated sodium Zeolite U recovered from the crystallization mother liquor with an aqueous solution of a salt of the metal to be ion-exchanged with the sodium Zeolite U. The desired ion-exchange may be accomplished by any of several different methods. Thus, the hydrated crystals of sodium Zeolite U or other alkali metal derivative of the Zeolite U may be stirred into an aqueous solution of a salt of the metal to be exchanged with the sodium, preferably a relatively concentrated solution of the salt, containing more than one equivalent proportion of the metal salt, preferably, from 2 to 1 to 20 to 1 molar proportions of the salt per mole of sodium in the Zeolite U present in the mixture, although the use of dilute aqueous solutions of low salt content are not thereby excluded from use. The sodium Zeolite U crystals are retained in the solution for a period of from a few minutes to several hours and may thereafter be again immersed in a fresh solution of the salt for a similar period in order to increase the net exchange of ions. Through successive repetitions of this procedure a major proportion (generally greater than 80%), up to about 95% of the sodium ions in the sodium Zeolite U are replaced with the metal ion to be exchanged therewith. A similar displacement may be accomplished on a continuous basis by permitting the salt solution to flow through a tube packed with the sodium Zeolite U crystals, the effluent solution of which may be charged into a serially connected bed of less completely exchanged sodium Zeolite U crystals in order to realize maximum benefit from a given quantity of the salt solution.

Metal ions which exchange with sodium in Zeolite U may be selected from ions both smaller and larger in molecular dimensions than sodium. Thus, the ions of metals, such as lithium, potassium, rubidium and cesium of the alkali metals may be readily exchanged from an aqueous solution of a salt of the metal by the aforementioned contact of the sodium Zeolite U with an aqueous solution of the salt. Alkaline earth metals, such as magnesium, strontium, calcium and barium may also be ion-exchanged for the sodium present in the Zeolite U, forming thereby the corresponding alkaline earth metal Zeolite U, in which at least a portion of the atoms of sodium have been replaced by the alkaline earth metal. The zeolite which is thereby formed, when activated by the aforementioned dehydration step, is a molecular sieve selectively capable of sorbing molecules having cross-sectional diameters of from about 4 to about 5 Angstrom units. The alkaline earth metal forms of Zeolite U are particularly useful molecular sieve separating agents for selectively removing normal or straight chain organic compounds containing at least 4 carbon atoms per molecule from their branched chain and cyclic analogs and homologs, the latter structural classes of compounds having cross-sectional diameters which do not permit them to enter pores of 5 Angstrom unit diameter. Thus, hydrocarbon mixtures containing normal and branched chain isomers, generally a difficult mixture to separate by other means, such as fractional distillation because of the formation of constant boiling and azeotropic mixtures, may be separated into substantially pure fractions of (1) the normal components and (2) a mixture of the cyclic and branched chain isomers by contacting the hydrocarbon mixture with an alkaline earth metal derivative of of Zeolite U and recovering the effluent consisting of the non-sorbed branched chain and cyclic components of the mixture substantially to the complete exclusion of the normal components. A typical mixture of compounds which may be separated in this manner, for example, is a gasoline fraction of petroleum which normally contains normal, branched chain and cyclic $C_4$ to $C_{11}$ hydrocarbons, the normal components of which have a relatively low octane rating for use as motor fuel. The normal components constitute a substantial proportion of the gasoline boiling range fraction, which if removed, increases the octane number of the non-sorbed effluent sufficiently to make the separation an economically practicable operation. Following an initial separation in which the so-called "spent" molecular sieves containing sorbed normal components are recovered from the higher octane, non-sorbed effluent, the sorbed normal components are recovered from the "spent" molecular sieve Zeolite U particles by any of several methods of removal. An especially effective desorption method involves displacement of the sorbed normal component(s) with a normal hydrocarbon of either lower or higher molecular weight. The desorbate effluent stream may be separately subjected to an isomerization treatment and the resulting mixture again subjected to separation. In this manner a given quantity of gasoline charge stock may be converted to the higher octane branched chain product substantially to extinction of the normal components. Other useful applications of the alkaline earth Zeolite U is its use for the separation of the normal or straight chain components of fuel oil fractions and jet fuel boiling petroleum cuts in order to recover fuels of high smoke point and low luminosity from the aromatic, naphthenic and branched chain components of the fractions having more pronounced luminosity and smoking characteristics, the recovery of polar impurities (such as mercaptans and nitrogen-containing compounds) from hydrocarbon fractions and for a wide variety of other applications known to the art.

Other forms of Zeolite U which may be synthesized from the sodium or other alkali metal derivative of the zeolite by ion-exchange methods include the ammonium ion form, the hydrogen ion form, and various other metal derivatives, such as zinc, silver, chromium, cerium, manganese, all generally being formed by the aforementioned ion-exchange procedure between the hydrated alkali metal derivative and an aqueous solution of the desired metal or ammonium salt. The hydrogen ion derivative of Zeolite U is formed by immersing the alkali metal or alkaline earth metal initial product in a weakly acidic aqueous solution of an acid, not less than about 4.0 pH over an extended period of time or by continuously washing the alkali or alkaline earth metal derivative with a stream of such acidulated water.

The present Zeolite U composition is identified and distinguished from other zeolites and other forms of molecular sieve sorbents of the metal aluminosilicate type on the basis of its physical and chemical properties, including its composition, its molecular sieve properties (selectivity), its optical character, its crystal habit, and especially by its powder X-ray diffraction pattern and crystal structure. The chemical composition of sodium Zeolite U corresponds to an inorganic compound having the following empirical formula:

$$Na_2O \cdot Al_2O_3 \cdot 4.3\text{–}5.55SiO_2 \cdot 5\text{–}8H_2O$$

One of the most direct, positive means of identifying and characterizing the present Zeolite U is by the X-ray powder diffraction method and by optical examination of its crystals. The method of identifying a crystalline substance by measuring the distances between the atoms making up its crystal lattice structure is a procedure of long standing and of accepted validity as a means of distinguishing different species of zeolites and definitely characterizes the present Zeolite U as a distinct crystalline form, not only different from other aluminosilicates but also different from other zeolites of the metal aluminosilicate type. For purposes of measuring the X-ray diffraction pattern of the present Zeolite U, the K doublet of copper (wavelength of 1.54 Angstrom units) was utilized as the source of radiation and a Geiger counter spectrometer was employed to measure the intensity of the scattered radiation. The peak heights of the radiation (indicated by the symbol: I) and the intensity of the strongest line or peak (represented by the symbol: $I_0$) provided the basis of calculating the relative intensities (that is, the factor: $I/I_0$) and the interplanar spacing in Angstrom units ($d_{obs.}$) corresponding to the lines recorded by the pen recorder of the spectrometer. A comparison of these values for the various ion-exchanged forms of Zeolite U with the corresponding values for the sodium and calcium forms of Zeolite U indicates that the observed interplanar distances for all of the various ion-exchanged forms of Zeolite U are substantially of the same value and peak intensities of the transmitted light occurred at essentially the same values of $d_{obs.}$ of refracted radiation; thus, the unit cells for all of the various ion-exchanged forms of Zeolite U are essentially of the same order of magnitude, except for only slight differences in value arising from differences in the size of the metal cations involved. This constancy in the size of the unit cells for the various ion-exchanged forms of Zeolite U is indicative of the fact that the arrangement of all of the $SiO_4$ and $AlO_4$ tetrahedra in the crystal units is the same for all forms of the Zeolite U. The following Table A presents the identifying crystallographic properties of the sodium, calcium and potassium derivatives of the present Zeolite U.

TABLE A.—POWDER X-RAY DIFFRACTION PATTERNS OF SODIUM, POTASSIUM AND CALCIUM FORMS OF ZEOLITE U

| Sodium Zeolite U | | Potassium Zeolite U | | Calcium Zeolite U | |
|---|---|---|---|---|---|
| $d_{obs.}$[1] | $I/I_0$[2] | $d_{obs.}$[1] | $I/I_0$[2] | $d_{obs.}$[1] | $I/I_0$[2] |
| 11.5 | 50 | 11.5 | 55 | 11.5 | 35 |
| 9.3 | 45 | 9.3 | 50 | 9.3 | 20 |
| 6.8 | 80 | 6.8 | 90 | 6.8 | 60 |
| 5.43 | 15 | 5.43 | 10 | 5.43 | 10 |
| 4.98 | 85 | 4.98 | 75 | 4.98 | 100 |
|  |  | 4.44 | 30 | 4.41 | 25 |
| 4.23 | 75 | 4.27 | 70 | 4.23 | 55 |
|  |  | 3.95 | 45 | 3.95 | 25 |
| 3.42 | 70 | 3.42 | 60 | 3.41 | 55 |
| 2.90 | 100 | 2.92 | 100 | 2.90 | 60 |
|  |  | 2.83 | 70 | 2.83 | 30 |
| 2.59 | 40 | 2.60 | 55 | 2.59 | 40 |
| 2.28 | 10 | 2.29 | 20 | 2.28 | 10 |
| 2.07 | 35 | 2.08 | 30 | 2.08 | 30 |

[1] $d_{obs.}$ represents the observed spectrographic interplanar spacings in Angstrom units.
[2] $I/I_0$ represents line intensities with respect to strongest line.

The essential difference in the crystal pattern of Zeolite U crystallites and chabazite is established by examining the response of the respective zeolites to optical examination, as, for example, in a determination of the refractive indices of the respective zeolites. Thus, the refractive indices of these zeolites is tabulated as follows (using light having the wavelength of green light, in a standard procedure):

Zeolite U (e.g., K-form):
    α ............................................. 1.448
    γ .............................................

Chabazite (e.g., K-form):
    α ............................................. 1.464
    γ ............................................. 1.468

The differences in crystal structure as indicated by the above refractive indices is thus substantial. Whereas chabazite is anisotropic (that is, transmits a beam of light from the primary beam not only along the alpha axis, but also along the gamma axis of the refractometer), Zeolite U is isotropic (transmitting a beam only along the alpha axis and none along the gamma axis of the refractometer). Furthermore, the fact that the light beam transmitted from Zeolite U along the α-axis differs in velocity substantially from the γ-beam of chabazite (the ratios of the velocities of respective transmitted beams, relative to their velocities in air being 1.448 vs. 1.464, respectively) indicates that the crystal structures differ substantially and confirms the conclusion that two substantively different compositions are involved. Thus, an isotropic crystal such as Zeolite U is cubic in structure, indicating that light transmitted from within the cubic will travel in all directions at the same speed. On the other hand, the structure of chabazite crystals is something other than cubic (being anisotropic).

Further evidence of a fundamental difference in the crystalline structure of Zeolite U compared to chabazite is the behavior of the respective zeolites as sorbents. These conclusions will be quantitatively confirmed in the examples hereof, but qualitatively, calcium Zeolite U (activated by dehydration of its water of crystallization) sorbs up to 12 percent of its weight of normal butane (0.12 part by weight of the hydrocarbon per part by weight of zeolite), whereas calcium chabazite (activated in similar fashion to remove its water of crystallization) sorbs no detectable quantity of the same hydrocarbon at the same or any other sorption conditions. In addition, the sodium derivatives of the two zeolites when activated by dehydration also behave dissimilarly with respect to the sorption of n-butane. Thus, sodium Zeolite U sorbs 4 parts of n-butane per 100 parts by weight of zeolite; chabazite sorbs nil, although the calcium-exchanged derivative of natural chabazite (Nova Scotia), after activation sorbs 2 parts per 100 parts by weight of n-butane at sorption conditions.

The foregoing and other distinctions conclusively establish the uniqueness and utility of Zeolite U as a metal aluminosilicate composition.

As heretofore stated, the present Zeolite U has sorptive capacities which are unique by comparison with some of the commonly known adsorbents, such as silica gel, activated carbon, alumina and others well known in the art. The latter adsorbents retain polar and unsaturated molecules on their surfaces by exclusively electrostatic forces, the adsorption (as distinguished from the quality of sorptiveness exhibited by molecular sieves) being clearly of the surface type with selectivities proportional to the boiling point or critical temperature of the various eligible adsorbates in a mixture of compounds. The present Zeolite U occludes the particular class of sorbate compounds retained within the pores of the zeolite by screening out and accepting into its pores only those molecules present in a mixture of compounds which fall within certain size limitations. This so-called molecular sieve action retains sorbed molecules within its pores by entrainment or entrapment of only those molecules present in the mixture whose cross-sectional diameters permit them to enter the pore openings formed in the zeolite when the latter is dehydrated or activated by loss of its water of hydration. The selectivity of Zeolite U for the sorbate component, therefore, approaches infinity, so that sorption is possible from mixtures containing extremely small concentrations of the sorbate or from gas mixtures in which the sorbate is present at extremely low vapor pressures. Consequently, the use of the present Zeolite U in separation processes permits recovery of sorbates from mixtures which could not be economically treated by other separating agents or adsorbents such as silica gel or charcoal. The latter adsorbents, therefore, have none of the molecular sieve activity of the product Zeolite U. For example, sodium Zeolite U, activated by heating to a dehydrating temperature, approximately 350° C., exhibits a marked selectivity at low temperatures for the oxygen component of nitrogen-oxygen mixtures, such as air, whereas charcoal and silica gel both adsorb substantial quantities of both gases at the same temperature and thus exhibit no selectivity toward oxygen.

The size of the pore openings in the sodium form of Zeolite U are from 3 to about 4 Angstrom units, permitting the entry into the pores (that is, sorption) of molecules having mean cross-sectional molecular diameters of about 4 Angstrom units or less, but excluding molecules having larger cross-sectional diameters. Thus, machine, ethane and propane are readily sorbed by activated sodium Zeolite U, but butane (to a much lesser extent) and homologs when contacted with the sorbent are substantially non-sorbed; their molecular diameters, therefore, are believed to exceed the cross-sectional diameters of the zeolite pores.

The alkaline earth ion-exchanged forms of Zeolite U which have pore openings of from about 4 to about 5 Angstrom units exhibit a selective molecular sieve action of a different type than the alkali metal derivative forms of Zeolite U. Thus, activated calcium Zeolite U besides accepting into its pores all of the gases and liquids capable of entering the pores of the alkali metal salt derivatives of Zeolite U, exhibits selective sorption activity toward molecules containing 4 or more carbon atoms, of straight chain or "normal" structure (as distinguished from compounds having a branched chain or cyclic structure) the normal compounds having cross-sectional diameters not exceeding about 5 Angstrom units. The zeolite exhibits lesser selectivity for compounds having fewer than 4 carbon atoms and greatest selectivity for compounds containing one or more polar radicals, the latter being sorbed and retained by the molecular sieve sorbent to a substantially greater degree than any non-polar compound, such as a hydrocarbon. This selectivity for normal compounds is also absent in the well-known adsorbents such as silica gel and charcoal. The maximum size in terms of cross-sectional diameter of the pores of calcium Zeolite U (representative, for example, of the alkaline earth derivative) is about 5 Angstrom units. Thus, cyclic compounds, such as benzene, which has a minimum projected cross-sectional diameter of about 6.8 Angstrom units, will not enter the pores of calcium Zeolite U by diffusion, although n-butane (maximum projected cross-sectional diameter of about 4.9 Angstrom units) will readily enter the pore openings and will be retained by the calcium form of Zeolite U. For the same reason isobutane (minimum projected cross-sectional diameter of about 5.6 Angstrom units) will not be appreciably sorbed by calcium Zeolite U.

Both the alkali metal and alkaline earth metal forms of Zeolite U preferentially sorb polar and unsaturated compounds from a mixture of sorbable compounds containing the same and saturated or non-polar components, even though the concentration or vapor pressure of the polar or unsaturated component is only a fraction of the mixture. Thus, water or carbon dioxide will be selectively removed from admixture with carbon monoxide, nitrogen, oxygen, hydrogen or a light hydrocarbon gas or liquid, although oxygen will be preferentially sorbed from admixture with nitrogen. Similarly, sulfur dioxide, ammonia and hydrogen sulfide will be preferentially sorbed from a mixture thereof with hydrogen, oxygen, nitrogen or carbon monoxide. If an unsaturated hydrocarbon occurs in admixture with it saturated analogs or homologs, the unsaturated component will be preferentially sorbed from the mixture. Thus, butene-1 will be selectively sorbed from a mixture of butene-1 and n-pentane, although n-butene is of lower molecular weight and generally, therefore, tending to be of lesser degree of sorbency on a molecular weight basis than n-pentane, n-butene nevertheless will be selectively removed from such a mixture.

The present invention is further described with respect to several of its embodiments in the following examples, which, however, are not intended to restrict the scope of the invention necessarily in accordance therewith.

*Example I*

In the following runs an aqueous solution of sodium aluminate was mixed with a material capable of yielding silicic acid, the identity of which was varied in each of the several runs in order to establish the effect of sodium ion concentration on the formation of Zeolite U. The aqueous sodium aluminate solution, containing various proportions of sodium aluminate, depending upon the run, was mixed with the source of silicic acid, the ratio of reactants being varied in the several preparations to provide metal oxide molar ratios within the following ranges:

$SiO_2/Al_2O_3$ ---------------------------------- 2.0–6.0
$Na_2O/SiO_2$ ---------------------------------- 0.15–0.6
$H_2O/NaO$ ---------------------------------- 40–100

The specific sources of silicic acid utilized in each of the runs are indicated in the footnotes in the following Table II. In those preparations in which sodium was present in an amount exceeding the minimum required stoichiometrically, it was supplied as sodium hydroxide dissolved in the aqueous solution or suspension of silicic acid, although such sources of additional sodium could also have been added to the aqueous mixture as sodium aluminate solution or by the addition of sodium silicate (water glass) to the silicic acid. In each instance the aqueous sodium aluminate solution was stirred vigorously in a glass beaker to which the silica sol was added in one dump. A gel forms immediately on mixing the solutions, the mixture being thereafter stirred until a homogeneous mix is obtained. The gel mix was then placed in a steam-heated autoclave maintained at 100° C. for a period of time indicated in the following table, varying for the several runs. A closed autoclave is a desirable form of reaction vessel in which to form the zeolite, since evaporation of water from the aqueous mix is obviated, maintaining the proportion of water in the mix at a substantially constant value. Following the indicated reaction period and after cooling, the product was filtered and subsequently washed with de-ionized water until the effluent filtrate had a pH of about 10. The filter cake product, a white powdery substance after air-drying to a constant weight was submitted to crystallographic examination to determine its identity. The X-ray diffraction pattern, microscopic crystal examination, refractive index, and in some cases the analysis of the air-dried product, was obtained in order to distinguish it from other varieties of hydrated sodium aluminosilicates having their own distinctive diffraction patterns and physical properties.

The sodium form of the zeolite obtained in the above manner was converted to the corresponding calcium form of the zeolite by ion-exchange of the sodium zeolite with a calcium salt solution. For this purpose, the washed zeolite product of the foregoing preparation was mixed at room temperature with a solution containing 80 grams of calcium chloride per liter of water, ion-exchange being effected by percolating the calcium chloride solution through a column of sodium Zeolite U crystals prepared as above indicated, utilizing a sufficient volume of the calcium salt solution to provide an excess of $Ca^{++}$ ion over that theoretically required for complete ion-exchange of all of the sodium ion from the zeolite. Another method of effecting the desired ion-exchange comprises mixing the sodium form of the zeolite with an aqueous solution of calcium chloride containing sufficient $Ca^{++}$ ion to theoretically displace all of the sodium ion from the salt, and allowing the mixture to stand for a period of from 10 minutes to about one hour, filtering and remixing the filter cake with a fresh solution of calcium chloride and repeating the procedure until the filtrate contains little if any sodium ions. By the foregoing means, an ion-exchanged, calcium form of Zeolite U is obtained in which at least 83 percent, up to in excess of 95 percent, of the original sodium ion in the zeolite is replaced with calcium. The calcium exchange takes place at room temperature, but higher or lower temperatures may also be employed.

The zeolite in both its sodium and calcium forms was activated (i.e., dehydrated) by heating the air-dried product at a temperature of about 350° C. and at pressures of from 1 to about 10 mm. of mercury for a period of about 2 hours. In another method for activating the zeolite particles, which was employed for some of the samples, perfluent nitrogen was forced through a column of the crystals at a temperature of about 350° C. for a period of from 1 to 4 hours. The recovered, activated zeolite particles have molecular sieve activity, as demonstrated by the ability of the particles to sorb normal butane from a mixture of normal and isobutanes. The activity (i.e., the capacity) of the several zeolite products prepared in the several runs and other physical and chemical properties of the products are noted in Table II hereinbelow.

TABLE II.—PREPARATION OF ZEOLITE U IN ITS SODIUM AND CALCIUM FORMS

| Run No. | 1 | 2 | 3 | 4 | 5 |
|---|---|---|---|---|---|
| Reagents, gms.: | | | | | |
| Sodium silicate [4] | | | | 210.7 | 25.2 |
| Sodium aluminate | 1 20 | 2 22.3 | 2 22.3 | 1 46.5 | 16.43 |
| Nalcoag,[3] 35% SiO$_2$ | 68.6 | 85.7 | 68.6 | | |
| Sodium hydroxide | 4.0 | 0.2 | 0.0 | | |
| Water | 87 | 48 | 59 | 650.0 | 110 |
| Mole ratios of oxides: Charged | | | | | |
| SiO$_2$/Al$_2$O$_3$ | 4.7 | 5 | 4 | 4.74 | 1.2 |
| Na$_2$O/Al$_2$O$_3$ | 1.73 | 1.2 | 1.2 | 2.79 | 1.40 |
| H$_2$O/Na$_2$O | 51.7 | 50 | 50 | 79.13 | 51.0 |
| Na$_2$O/SiO$_2$ | 0.37 | 0.24 | 0.3 | 0.59 | 1.14 |
| Crystallization period at 100° C., hrs | 68 | 86 | 5 107 | 18 | 16 |
| Yield Na-zeolite, gms | 44.4 | 62.7 | 55.6 | 20.7 | 20.1 |
| Zeolite type | (8) | (6) | (7) | (6) | (7a) |
| Capacity,[9] gms. sorbed/100 gms. of zeolite | 11.7 | 15.7 | 5.9 | 0.0 | 13.1 |
| Mole ratio of oxides in zeolite | (10) | (12) | (11) | | |

[1] Supplied by Monsanto Chemical Co.: 25.7 volatiles; 69.3% NaAlO$_2$; 5.0% NaOH.
[2] Supplied by National Aluminate Corp., Grade 680: 20.0% volatiles; 73.6% NaAlO$_2$; 6.4% NaOH.
[3] Supplied by National Aluminate Corp.: 35% SiO$_2$, substantially free of sodium; SiO$_2$ in the form of colloidal silica sol.
[4] Water glass: 27.0% SiO$_2$; 9.5% Na$_2$O; 63.5% H$_2$O.
[5] Produced at 120° C.
[6] Completely Gismondite, as determined by X-ray diffraction pattern. Crystals are about 10μ in size.
[7] Zeolite U, mixed with small quantities of Gismondite. X-ray diffraction pattern of mixture indicates a weak pattern of orthorhombic Gismondite, plus a strong pattern of Zeolite U, 0.5μ in size.
[7a] Zeolite A, the type covered by U.S. Patent 2,882,243, issued to R. M. Milton, having an X-ray diffraction pattern disclosed and described in said U.S. Patent, about 1.5μ in size.
[8] Zeolite U, with strong spectrum of product described in Table A for sodium Zeolite U.
[9] Capacity of calcium salt of zeolite (Zeolite U 83% Ca exchanged) determined by sorption of n-butane on zeolite at atmospheric pressure and at 25° C.
[10] Na$_2$O·Al$_2$O$_3$·4.6SiO$_2$·7H$_2$O, calcium-exchanged form (83.7% exchanged; 0.97(CaO, Na$_2$O)·Al$_2$O$_3$·4.4SiO$_2$·6.4H$_2$O.
[11] 0.93Na$_2$O·Al$_2$O$_3$·4.3SiO$_2$·6.6H$_2$O.
[12] 0.98Na$_2$O·Al$_2$O$_3$·5.55SiO$_2$·7.9H$_2$O.

*Example II*

A silica-alumina gel in which the silica to alumina ratio was approximately 5.0 was prepared by mixing a preformed silica sol with an alumina sol the mixed gel being precipitated by mixing the sols with ammonium hydroxide. The precipitated gel mixture was washed with deionized water until the washings (filtrate) was substantially ion-free. The recovered (filter cake) gel mixture was thereafter mixed with sufficient water and potassium hydroxide to yield an aqueous mixture containing the following oxide ratios:

| | |
|---|---|
| SiO$_2$/Al$_2$O$_3$ | 5.0 |
| K$_2$O/SiO$_2$ | 0.5 |
| K$_2$O/Al$_2$O$_3$ | 2.5 |
| H$_2$O/K$_2$O | 98.0 |

The resulting mixture was stirred to form a slurry and thereafter transferred into an autoclave and heated for 16 hours at 150° C. (in the closed autoclave). At the end of this period of reaction a mass of crystals had separated from a clear upper aqueous layer. The resulting crystals were filtered from the mother liquor and the filter cake washed with deionized water until the filtrate had a pH of about 9.0. The crystals were air-dried and allowed to attain equilibrium (constant weight) with respect to the ambient atmosphere at room temperature (approximately 26° C.). This material has a refractive index of 1.464 (α-axis) and 1.468 γ-axis). Examination of the crystals which are approximately 10 microns in length and of lenticular shape. Analysis of air-dried solid (hydrate) provides an empirical formula for the potassium salt as:

0.90 K$_2$O; 1.00 Al$_2$O$_3$; 4.52 SiO$_2$·4.47 H$_2$O

Examination of the crystals by X-ray diffraction methods establishes the material as potassium chabazite having the properties and X-ray diffraction pattern reported by R. M. Barrer and J. W. Baynham in J. Chem. Soc., 1959, page 2882. Its X-day diffraction pattern is tabulated in Table III which follows.

A sample of the hydrated potassium chabazite prepared as indicated above (containing 16.1% K$_2$O) was ion-exchanged to produce the corresponding sodium and calcium salt derivatives. The ion exchange proceeds slowly, even at 100° C. and with concentrated calcium and sodium chloride solutions. Thus, to prepare the calcium-exchanged chabazite salt, the potassium salt was heated in a 15% aqueous calcium chloride solution (1000% excess Ca$^{++}$) for 2 hours. After settling, the supernatant liquor was decanted from the crystals which were washed until the filtrate was chloride-free, air dried and analyzed for potassium. Only 41% of the potassium had been exchanged in the initial exchange reaction. The filtered salt was again heated in a 15% (1000% excess Ca$^{++}$) aqueous calcium chloride solution for an additional period of 2 hours at 100° C. (68% calcium exchanged). After a third exchange reaction, 85% of the potassium had been displaced by ion exchange. Succeeding ion-exchange reactions at substantially the above conditions did not appreciably increase the displacement of potassium. When activated in the manner described above (i.e., dehydrating the water of crystallization), the calcium exchanged zeolite had substantially no molecular sieve activity, as measured by its ability to sorb hydrocarbons.

The sodium-exchanged derivatives of potassium chabazite was formed by a procedure of sodium exchange between potassium chabazite and sodium chloride essentially similar to the foregoing calcium exchange procedure, except that a 15% aqueous sodium chloride solution was utilized as the source of sodium ion. The X-ray diffraction pattern of the sodium salt derivative of chabazite is shown and tabulated in Table III, hereinbelow. The sorptiveness of the sodium salt derivative was also determined by passing a hydrocarbon mixture through a mass of the crystals activated by dehydration at 350° C. The salt was completely inactive as molecular sieve sorbent.

The difference in crystal structure and form of chabazite and its derivatives salts is also verified by contrast in the ease of effecting ion-exchange between the alkali metal zeolite and a calcium salt or a different alkali metal salt in aqueous solution. Thus, Zeolite U will undergo 95% exchange of its sodium ion with calcium at room temperature (24° C.) with the sodium Zeolite U immersed in a 15% aqueous solution of calcium chloride for 2 hours.

The X-ray diffraction patterns for the various sodium, potassium, calcium and natural chabazites are tabulated in numerical form in the following Table III; comparison of the relative intensities of the transmitted radiation at the indicated interplanar spacings within the crystals with the corresponding values given for the salts of Zeolite U in Table A, above, establish the individuality of the respective zeolites and conclusively point to dissimilarity in species.

TABLE III.—X-RAY DIFFRACTION PATTERNS FOR THE CHABAZITE SALTS

| Sodium chabazite | | Potassium chabazite | | Calcium chabazite | | Natural chabazite [1] | |
|---|---|---|---|---|---|---|---|
| $d_{obs.}$ | $I/I_0$ | $d_{obs.}$ | $I/I_0$ | $d_{obs.}$ | $I/I_0$ | $d_{obs.}$ | $I/I_0$ |
| 9.3 | 80 | 9.3 | 80 | 9.3 | 53 | 9.3 | 75 |
| 6.8 | 25 | 6.9 | 25 | 6.8 | 31 | 6.8 | 20 |
|  |  |  |  | 6.3 | 6 | 6.3 | 5 |
| 5.5 | 20 | 5.5 | 15 | 5.5 | 35 | 5.5 | 35 |
| 4.98 | 40 | 4.98 | 30 | 4.98 | 50 | 4.98 | 35 |
| 4.64 | 6 | 4.67 | 7 | 4.62 | 6 | 4.62 | 10 |
| 4.29 | 80 | 4.33 | 70 | 4.29 | 100 | 4.29 | 100 |
|  |  |  |  | 4.03 | 6 |  |  |
| 3.95 | 8 | 3.97 | 10 | 3.95 | 10 | 3.95 | 7 |
| 3.86 | 20 | 3.86 | 30 | 3.86 | 25 | 3.85 | 20 |
| 3.57 | 25 | 3.57 | 25 | 3.57 | 30 | 3.56 | 35 |
| 3.44 | 20 | 3.45 | 15 | 3.44 | 30 | 3.44 | 15 |
|  |  |  |  |  |  | 3.34 | 4 |
| 3.22 | 10 | 3.23 | 10 | 3.22 | 9 | 3.20 | 5 |
| 3.16 | 10 | 3.17 | 15 | 3.16 | 15 | 3.16 | 10 |
| 2.92 | 100 | 2.92 | 100 | 2.92 | 95 | 2.92 | 55 |
| 2.88 | 40 | 2.89 | 65 | 2.88 | 40 | 2.88 | 30 |
|  |  |  |  |  |  | 2.83 | 5 |
| 2.77 | 6 | 2.78 | 5 | 2.76 | 6 | 2.76 | 5 |
| 2.68 | 8 | 2.69 | 7 | 2.67 | 9 | 2.67 | 15 |
| 2.60 | 20 | 2.60 | 25 | 2.60 | 25 | 2.60 | 20 |
|  |  | 2.58 | 7 |  |  | 2.56 | 5 |
| 2.50 | 10 | 2.50 | 10 | 2.49 | 15 | 2.49 | 20 |
|  |  | 2.35 | 5 | 2.34 | 4 | 2.34 | 4 |
| 2.29 | 6 | 2.30 | 9 | 2.29 | 10 | 2.29 | 5 |
|  |  |  |  |  |  | 2.27 | 5 |
| 2.12 | 4 |  |  |  |  |  |  |
| 2.08 | 10 | 2.09 | 10 | 2.08 | 15 | 2.08 | 10 |

[1] Mineral chabazite mined in Nova Scotia.

A comparison of the X-ray diffraction patterns for the chabazite salts shown in Table III with the patterns for the corresponding salts of Zeolite U indicates a difference in crystal structure between chabazite and Zeolite U. The most clear cut evidence of this is the presence of a strong 11.5 A. line in Type U which is missing in all the forms of chabazite. Likewise there are fairly strong lines present in all the chabazites for the 3.57 A., 3.16 A. and 2.49 A. spacings which are entirely missing from the Zeolite U pattern.

I claim as my invention:

1. A synthetic, crystalline aluminosilicate having a composition expressed in terms of mol ratios of oxides as follows:

$$M_{2/n}O:Al_2O_3:XSiO_2:YH_2O$$

where M is a cation selected from the group consisting of hydrogen, ammonium, an alkali metal, and an alkaline earth metal, n is the valence of the cation, X has a value of from 4.3 to 5.55, Y has a value up to about 8, the crystals of said alumino silicate being isotropic and prepared from substantially alkali metal free silica sol and the X-ray diffraction patterns of the alkali metal and alkaline earth metal derivatives having numerical values designated for the sodium, potassium and calcium derivatives in Table A of the annexed specification.

2. A synthetic, crystalline aluminosilicate as defined in claim 1 further characterized in that the α refractive index is about 1.448.

3. A synthetic, crystalline aluminosilicate having a composition expressed in terms of mol ratios of oxides as follows:

$$Na_2O:Al_2O_3:XSiO_2:YH_2O$$

where X has a value of from 4.3 to 5.55, Y has a value up to about 8, the crystals of said aluminosilicate being isotropic and prepared from substantially alkali metal free silica sol and the X-ray diffraction pattern thereof having the numerical values designated for the sodium derivative in Table A of the annexed specification.

4. A synthetic, crystalline aluminosilicate having a composition expressed in terms of mol ratios of oxides as follows:

$$K_2O:Al_2O_3:XSiO_2:YH_2O$$

where X has a value of from 4.3 to 5.55, Y has a value up to about 8, the crystals of said aluminosilicate being isotropic and prepared from substantially alkali metal free silica sol and the X-ray diffraction pattern thereof having the numerical values designated for the potassium derivative in Table A of the annexed specification.

5. A synthetic, crystalline aluminosilicate having a composition expressed in terms of mol ratios of oxides as follows:

$$CaO:Al_2O_3:XSiO_2:YH_2O$$

where X has a value of from 4.3 to 5.55, Y has a value up to about 8, the crystals of said aluminosilicate being isotropic and prepared from substantially alkali metal free silica sol and the X-ray diffraction pattern thereof having the numerical values designated for the calcium derivative in Table A of the annexed specification.

References Cited by the Examiner

UNITED STATES PATENTS 3,008,803  11/1961  Milton _____ 23—113
3,056,654  10/1962  Barrer et al. _____ 23—113

FOREIGN PATENTS 777,233  6/1957  Great Britain.

OTHER REFERENCES

Barrer et al., "Jr. Chem. Soc.," Part 3, pages 2882–2903, 1956.

BENJAMIN HENKIN, *Primary Examiner.*

MAURICE A. BRINDISI, *Examiner.*